United States Patent
Mukherjee et al.

(10) Patent No.: US 11,507,379 B2
(45) Date of Patent: Nov. 22, 2022

(54) MANAGING LOAD AND STORE INSTRUCTIONS FOR MEMORY BARRIER HANDLING

(71) Applicant: Marvell World Trade Ltd., St. Michael (BB)

(72) Inventors: Shubhendu Sekhar Mukherjee, Southborough, MA (US); Michael Bertone, Marlborough, MA (US); David Albert Carlson, Haslet, TX (US)

(73) Assignee: Marvell Asia Pte, Ltd., Singapore (SG)

( * ) Notice: Subject to any disclaimer, the term of this patent is extended or adjusted under 35 U.S.C. 154(b) by 167 days.

(21) Appl. No.: 16/427,678

(22) Filed: May 31, 2019

(65) Prior Publication Data

US 2020/0379772 A1 Dec. 3, 2020

(51) Int. Cl.
*G06F 9/38* (2018.01)
*G06F 9/30* (2018.01)

(52) U.S. Cl.
CPC ........ *G06F 9/3842* (2013.01); *G06F 9/30043* (2013.01); *G06F 9/30087* (2013.01); *G06F 9/3834* (2013.01); *G06F 9/3867* (2013.01)

(58) Field of Classification Search
CPC .. G06F 9/30087; G06F 9/3836; G06F 9/3842; G06F 9/3867; G06F 9/52; G06F 9/522; G06F 9/30043; G06F 9/3834
See application file for complete search history.

(56) References Cited

U.S. PATENT DOCUMENTS

| | | | | |
|---|---|---|---|---|
| 5,584,037 A | * | 12/1996 | Papworth | G06F 5/14 |
| | | | | 712/23 |
| 5,615,350 A | * | 3/1997 | Hesson | G06F 9/383 |
| | | | | 711/E12.02 |

(Continued)

OTHER PUBLICATIONS

Lin, C.: Nagarajan, V.; Gupta, R.: Fence Scoping. In: SC '14: Proceedings of the International Conference for High Performance Computing, Networking, Storage and Analysis, 2014, S. 105-116. <https://doi.org/10.1109/SC.2014.14> last downloaded on Mar. 27, 2020].

(Continued)

*Primary Examiner* — Jyoti Mehta
*Assistant Examiner* — Kasim Alli
(74) *Attorney, Agent, or Firm* — Young Basile Hanlon & MacFarlane, P.C.

(57) ABSTRACT

A front-end portion of a pipeline includes a stage that speculatively issues at least some instructions out-of-order. A back-end portion of the pipeline includes one or more stages that access a processor memory system. In the front-end (back-end), execution of instructions is managed based on information available in the front-end (back-end). Managing execution of a first memory barrier instruction includes preventing speculative out-of-order issuance of store instructions. The back-end control circuitry provides information accessible to the front-end control circuitry indicating that one or more particular memory instructions have completed handling by the processor memory system. The front-end control circuitry identifies one or more load (Continued)

instructions that were issued before the first memory barrier instruction was issued and are ordered after the first memory barrier instruction, and causes at least one of the identified load instructions to be reissued after the first memory barrier instruction has been issued.

22 Claims, 2 Drawing Sheets

(56) References Cited

U.S. PATENT DOCUMENTS

| | | | | |
|---|---|---|---|---|
| 6,098,166 | A | 8/2000 | Leibholz et al. | |
| 6,625,660 | B1* | 9/2003 | Guthrie | G06F 9/30087 709/248 |
| 6,880,073 | B2* | 4/2005 | Arimilli | G06F 9/30087 712/235 |
| 7,689,813 | B2* | 3/2010 | Caprioli | G06F 9/3857 712/219 |
| 8,935,513 | B2* | 1/2015 | Guthrie | G06F 9/3834 712/216 |
| 9,535,695 | B2 | 1/2017 | Mylius et al. | |
| 9,870,328 | B2 | 1/2018 | Mukherjee et al. | |
| 2002/0194457 | A1 | 12/2002 | Akkary | |
| 2012/0173848 | A1 | 7/2012 | Sun et al. | |
| 2016/0140043 | A1 | 5/2016 | Mukherjee et al. | |

OTHER PUBLICATIONS

Shinsel, Alex: Understanding the Instruction Pipeline. In: Intel. Santa Clara (USA): Tech.Decoded. Apr. 25, 2018. S. 1-7. -Firmenschrift. <https://web.archive.org/web/20180425131705/https://techdecoded.intel.io/resour>ces/understanding-the-instruction-pipeline/# [last downloaded on Mar. 27, 2020].

Asanovic, Krste: Lecture 15: Out-of-Order Memory Accesses, Complex Superscalar Review, Computer Science 152 Computer Architecture and Engineering, University of California at Berkeley, Folien 1-28, Mar. 31, 2019. URL: <https://inst.eecs.berkeley.edu/-cs152/sp09/> [last downloaded on Mar. 27, 2020].

Memory barrier. In: Wikipedia, the free encyclopedia. Bearbeitungsstand: Apr. 5, 2019. URL: <https://en.wikipedia.org/w/index.php?title=Memory_barrier&oldid=891104823> [last downloaded on Mar. 27, 2020].

Cache coherence. In: Wikipedia, the free encyclopedia. Bearbeitungsstand: May 27, 2019. URL: <https://en>. wikipedia.org/w/index.php?title=Cache_coherence&oldid=899087755 [last downloaded on Mar. 27, 2020].

* cited by examiner

MANAGING LOAD AND STORE INSTRUCTIONS FOR MEMORY BARRIER HANDLING

BACKGROUND

The invention relates to managing load and store instructions for memory barrier handling.

A processor pipeline includes multiple stages through which instructions advance, a cycle at a time. In a scalar processor, instructions proceed one-by-one through the pipeline, with at most a single instruction being committed per cycle. In a superscalar processor, multiple instructions may proceed through the same pipeline stage at the same time, allowing more than one instruction to issue per cycle, depending on certain conditions (called hazards), up to an issue width. Some processors issue instructions in-order (according to a program order), with consecutive instructions proceeding through the pipeline in program order. Other processors allow instructions to be reordered and issued out-of-order, which potentially increases overall pipeline throughput. If reordering is allowed, instructions can be reordered within a sliding instruction window (whose size can be larger than the issue width), and a reorder buffer can be used to temporarily store results (and other information) associated with instructions in the instruction window to enable the instructions to be committed in-order (potentially allowing multiple instructions to be committed in the same cycle as long as they are contiguous in the program order).

SUMMARY

In one aspect, in general, an integrated circuit includes: at least a first processor core executing instructions in a pipeline, wherein the pipeline includes one or more stages in a front-end portion of the pipeline and a plurality of stages in a back-end portion of the pipeline, the front-end portion including a stage that speculatively issues at least some instructions out-of-order according to a program order, and the back-end portion including one or more stages that access a processor memory system; front-end control circuitry configured to manage execution of instructions based on information available in the front-end portion; and back-end control circuitry configured to manage execution of instructions based on information available in the back-end portion. Managing execution of a first memory barrier instruction includes: preventing speculative out-of-order issuance of store instructions by the stage that speculatively issues at least some instructions out-of-order, the back-end control circuitry providing information accessible to the front-end control circuitry indicating that one or more particular memory instructions have completed handling by the processor memory system, the front-end control circuitry identifying one or more load instructions that were issued before the first memory barrier instruction was issued and are ordered after the first memory barrier instruction in the program order, and the front-end control circuitry causing at least one of the identified load instructions to be reissued after the first memory barrier instruction has been issued.

In another aspect, in general, a method includes: executing instructions in a pipeline of at least a first processor core, wherein the pipeline includes one or more stages in a front-end portion of the pipeline and a plurality of stages in a back-end portion of the pipeline, the front-end portion including a stage that speculatively issues at least some instructions out-of-order according to a program order, and the back-end portion including one or more stages that access a processor memory system; managing execution of instructions, in front-end control circuitry, based on information available in the front-end portion; and managing execution of instructions, in back-end control circuitry, based on information available in the back-end portion. Managing execution of a first memory barrier instruction includes: preventing speculative out-of-order issuance of store instructions by the stage that speculatively issues at least some instructions out-of-order, the back-end control circuitry providing information accessible to the front-end control circuitry indicating that one or more particular memory instructions have completed handling by the processor memory system, the front-end control circuitry identifying one or more load instructions that were issued before the first memory barrier instruction was issued and are ordered after the first memory barrier instruction in the program order, and the front-end control circuitry causing at least one of the identified load instructions to be reissued after the first memory barrier instruction has been issued.

Aspects can include one or more of the following features.

Causing at least one of the identified load instructions to be reissued after the first memory barrier instruction has been issued includes causing all of the identified load instructions to be reissued after the first memory barrier instruction has been issued.

Causing at least one of the identified load instructions to be reissued after the first memory barrier instruction has been issued comprises causing one or more selected load instructions of the identified load instructions to be reissued after the first memory barrier instruction has been issued, where a selected load instruction includes any load instruction that include a target address that matches an address associated with an invalidation instruction that is ordered before the first memory barrier instruction and after the selected load instruction in the program order.

The invalidation instruction is received by the first processor core by a second processor core that is included in the integrated circuit in communication with the first processor core.

The one or more particular memory instructions include all store instructions that: (1) are ordered before the first memory barrier instruction in the program order, and (2) had not completed handling by the processor memory system when the first memory barrier instruction was received by the front-end control circuitry.

Managing execution of the first memory barrier instruction further includes, by the front-end circuitry: (1) determining that all instructions ordered before the first memory barrier instruction in the program order have completed execution, (2) committing, in the program order, all instructions ordered before the first memory barrier instruction in the program order, and (3) committing the first memory barrier instruction.

Managing execution of the first memory barrier instruction further includes preventing speculative out-of-order issuance of input/output (I/O) load instructions by the stage that speculatively issues at least some instructions out-of-order.

The processor memory system further includes: a write buffer for initiating execution of store instructions, and a data cache for initiating execution of load instructions.

The information indicating that one or more particular memory instructions have completed handling by the processor memory system include: information indicating that one or more particular store instructions have been sent to the write buffer, and results of one or more particular load instructions from the data cache or indication that one or more particular load instructions resulted in a miss in the data cache.

Managing execution of a first memory barrier instruction further includes: the front-end control circuitry maintaining ordering information for load instructions based on the program order.

The identified load instructions are identified by the front-end control circuitry based at least in part on the ordering information maintained by the front-end control circuitry.

Aspects can have one or more of the following advantages.

With out-of-order issuance of instructions, architectural state may be temporarily inconsistent with the program order. Barrier instructions can be issued to ensure that certain software-visible architectural state is consistent. For example, in a multi-core processor, a barrier instruction can be used to ensure there is a consistent global state as observed by software executing on different processor cores. There may be different types of barrier instructions that enforce order for different kinds of instructions. A memory barrier instruction, such as a Data Memory Barrier (DMB) instruction used in some processor architectures, can be used to ensure that any observable effects of certain memory access instructions occur in-order with respect to a program order. For example, any load and store instructions that occur before the memory barrier in program order are observable as having been performed before all load and store instructions that occur after the memory barrier in program order. If such instructions were actually performed out-of-order but their observable effects after they have been committed appear as though they were performed in-order, then the condition of the memory barrier has been satisfied. The following is an example of a sequence of (pseudocode) instructions in a program order (from top to bottom):

Store X DATA
Memory Barrier
Load Y

The instruction "Store X DATA" stores DATA (e.g., by way of a register that stores a value of data to be stored) to a memory address X. The instruction "Memory Barrier" indicates that all previous load and store instructions should be completed. The instruction "Load Y" loads data from a memory address Y. The effect of the memory barrier instruction between the store and load instructions in this example is that the result of the store instruction is guaranteed to be globally observable before the result of the load instruction (performed by the same core that performed the store instruction) is globally observable. Without the memory barrier instruction, the load instruction could have completed execution prior to the store instruction if the instructions were issued out-of-order. The techniques described herein enable implementation of such memory barrier instructions without significantly sacrificing performance.

Other features and advantages of the invention will become apparent from the following description, and from the claims.

DESCRIPTION

Figure 1:
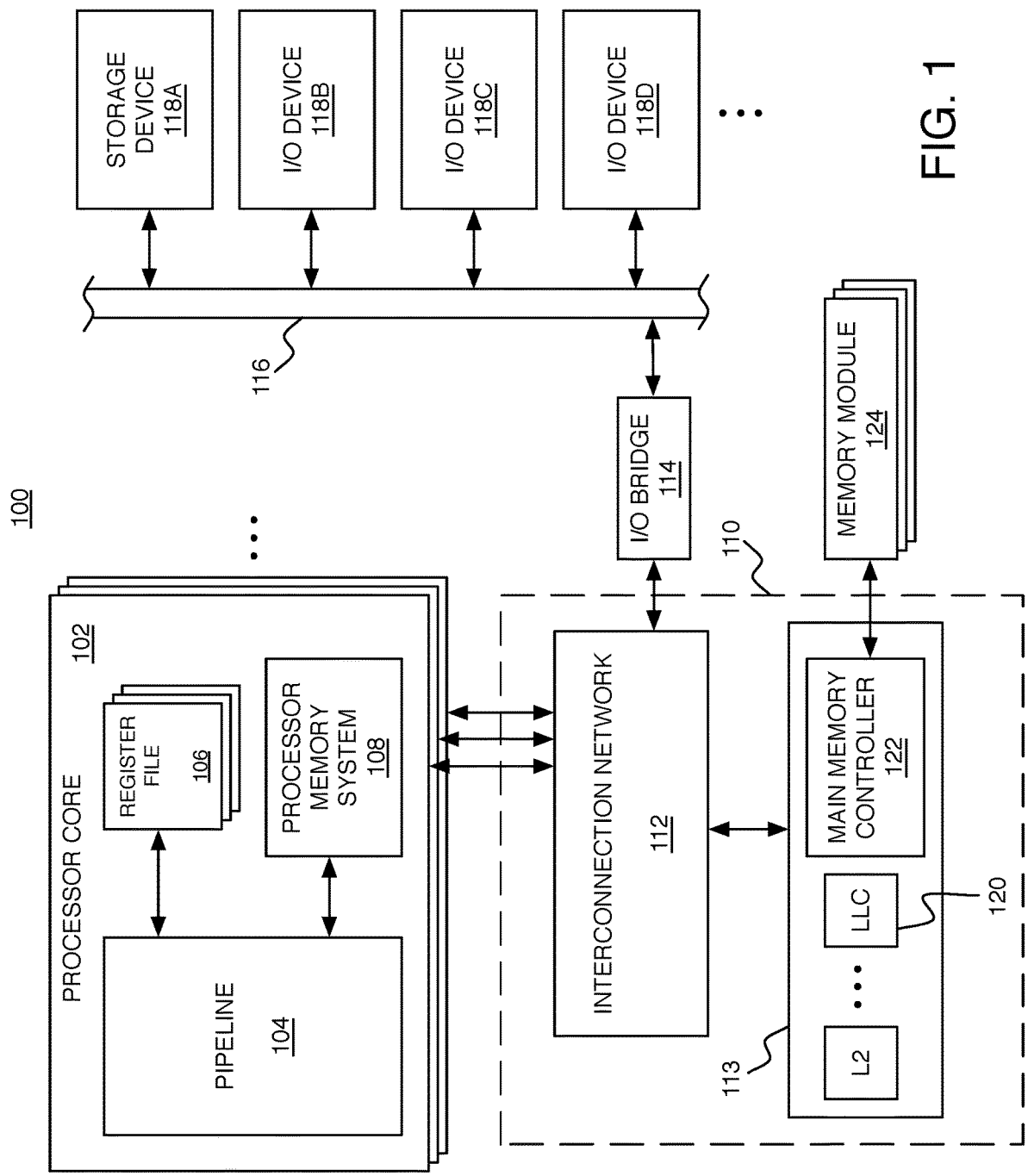
FIG. 1 is a schematic diagram of a computing system.

FIG. 1 shows an example of a computing system 100 in which the memory barrier handling techniques described herein can be used. The system 100 includes at least one processor core 102, which could be a single central processing unit (CPU), or one of multiple processor cores in a multi-core architecture, where each processor core (or each "core") comprises an individual CPU with associated circuitry. In this example of a multi-core architecture, each processor core 102 includes a pipeline 104, one or more register files 106, and a processor memory system 108. Each processor core 102 is connected to an uncore 110, which includes an interconnection network 112 (e.g., bus, cross-bar switch, mesh network, etc.) and an external memory system 113. The interconnection network 112 enables communication with the external memory system 113 and an input/output (I/O) bridge 114. The I/O bridge 114 enables communication over an I/O bus 116, with various different I/O devices including a storage device 118A and other I/O devices 118B-118D (e.g., network interface, display adapter, and/or user input devices such as a keyboard or mouse). The storage device 118A such as a disk drive or other large capacity (typically non-volatile) storage device can spare some space to serve as secondary storage (or a 'backing store') in a virtual memory scheme for the (typically volatile) main memory.

The processor memory system 108 and external memory system 113 together form a hierarchical memory system including at least a first level (L1) cache within the processor memory system 108, and any number of higher level (L2, L3, . . . ) caches within the external memory system 113. At each level, the cache can include a module that provides an instruction cache for caching instructions, and separate module that provides a data cache for caching data. In addition to an L1 instruction cache and data cache, the processor memory system 108 includes a TLB, and various other circuitry for handling a miss in the L1 instruction or data caches or in the TLB. For example, that circuitry in the processor memory system 108 of a processor core 102 can include a write buffer for temporarily holding values to be written from a store instruction that has been executed, and committed, within the pipeline 104.

The highest level cache within the external memory system 113 (which may be the L2 cache if there are only two levels in the hierarchy) is the LLC 120, which is accessed just before main memory. Of course, this is only an example. The exact division between which level caches are within the processor memory system 108 and which are in the external memory system 113 can be different in other examples. For example, the L1 cache and the L2 cache could both be internal to the processor core 102, and the L3 (and higher) caches could be external to the processor core 102. Each processor core 102 could have its own internal L1 cache, and the processor cores could share an L2 cache. The external memory system 113 also includes a main memory controller 122, which is connected to any number of memory modules 124 serving as main memory (e.g., Dynamic Random Access Memory modules). In a particular cache level of the hierarchy, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (read or write) the memory block from a higher level cache, or from the main memory (in the case of a miss in the LLC).

The pipeline 104 includes multiple stages through which instructions advance, a cycle at a time. Some stages occur in a front-end portion of the pipeline. An instruction is fetched (e.g., in an instruction fetch (IF) stage or stages). Instructions are fetched based on a program counter (PC), which is a pointer that is used to identify instructions within memory (e.g., within a portion of main memory, or within an instruction cache of the processor). The PC may advance through addresses of a block of compiled instructions (called a "basic block"), incrementing by a particular number of bytes (depending on how long each instruction is and on how many instructions are fetched at a time). An instruction is then decoded (e.g., in an instruction decode (ID) stage or stages) to determine an operation and one or more operands. Alternatively, in some pipelines, the instruction fetch and instruction decode stages could overlap. An instruction has its operands fetched (e.g., in an operand fetch (OF) stage or stages). An instruction is then ready to be issued. Issuing an instruction starts progression of the instruction through stages in a back-end portion of the pipeline to execute the instruction. Execution may involve applying the instruction's operation to its operand(s) to produce a result for an arithmetic logic unit (ALU) instruction, storing or loading to or from a memory address for a memory instruction, or may involve evaluating a condition of a conditional branch instruction to determine whether or not the branch will be taken. After an instruction has completed execution, the instruction can be committed so that any effect of the instruction is made globally visible to software. Committing an instruction may involve storing a result in a register file (e.g., in a write back (WB) stage or stages), for example. In most implementations, even if any instructions were issued out-of-order, all instructions are generally committed in-order.

Figure 2:
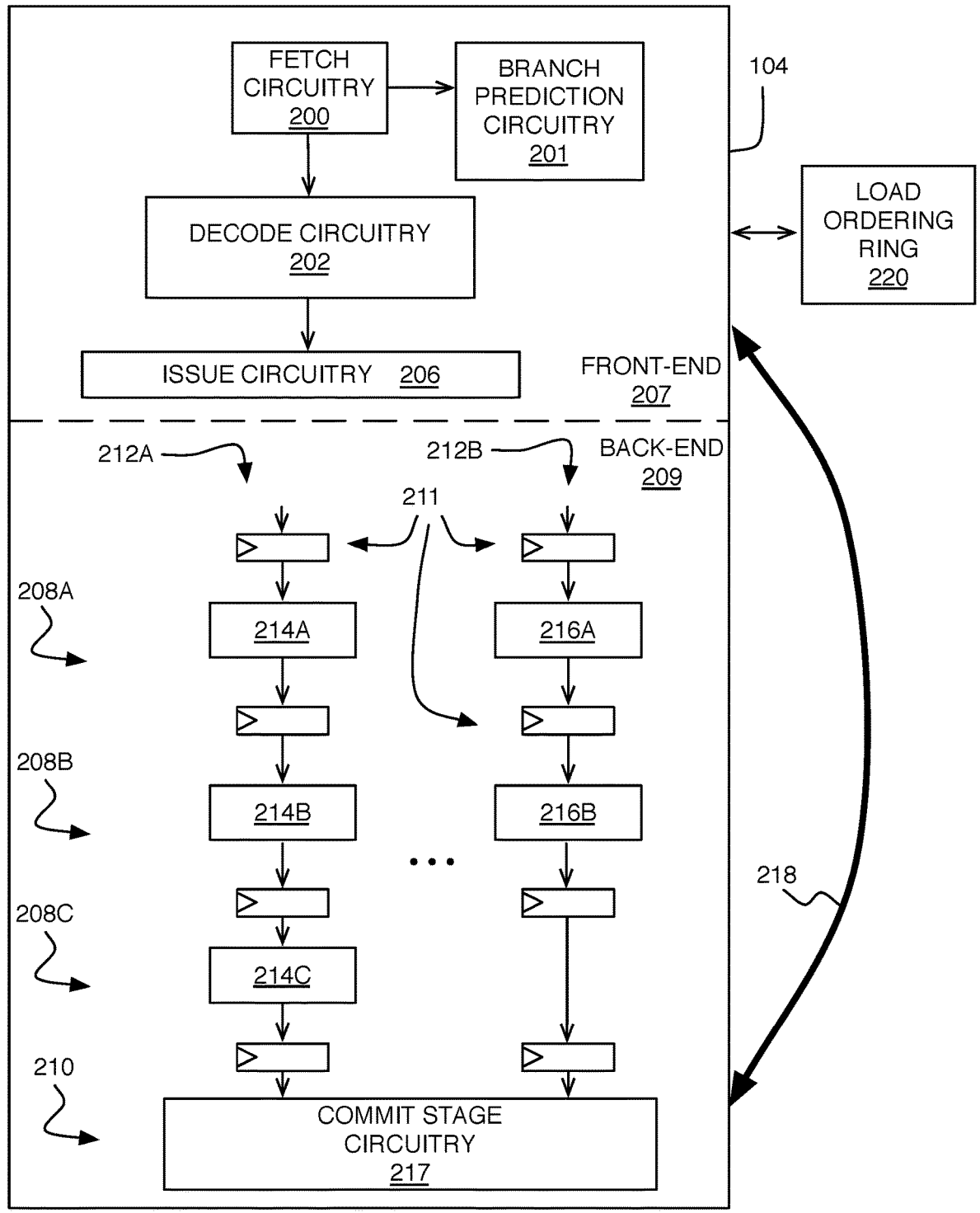
FIG. 2 is a schematic diagram of a processor core pipeline.

FIG. 2 shows an example in which the pipeline 104 is configured to manage load and store instructions in an efficient manner when handling memory barrier instructions, as will be described in more detail below. The pipeline 104 includes circuitry for the various stages. For one or more instruction fetch stages, instruction fetch circuitry 200 provides a PC to an instruction cache in the processor memory system 108 (FIG. 1) to fetch instructions to be fed into the pipeline 104. For example, the PC can be a virtual address of the next instruction, in which case the PC can be incremented by the length of a virtual address in the case of sequential execution (i.e., without taking any branches). The fetch circuitry 200 also provides the program counter to branch prediction circuitry 201, which is used to provide a predicted branch result for branch instructions for speculative execution of instructions (potentially out-of-order). The branch prediction circuitry 201 also stores branch history information that is updated based on a received actual branch result. In some implementations, some or all of the branch prediction circuitry 201 is considered part of the fetch circuitry 200. For one or more instruction decode stages, instruction decode circuitry 202 stores information in an issue queue for instructions in the instruction window waiting to be issued.

Issue circuitry 206 determines in which cycle each of the instructions in the issue queue are to be issued, and sends instructions from the front-end 207 of the pipeline 104 to start progression through execution stages 208A, 208B, and 208C in the back-end 209 of the pipeline 104. (For simplicity, this example has three execution stages, but other examples may have more or fewer execution stages.) There is also at least one commit stage 210 in the back-end 209 that commits results of some instructions that have made their way through the execution stages 208A, 208B, and 208C. For example, commit stage circuitry 217 may write back a result into a register file 106 (FIG. 1). However, some instructions may not be committed by the commit stage circuitry 217, but may instead be committed by circuitry in the front-end 207 using a communication pathway 218 that can be used to send information between one or more stages in the back-end 209 and one or more stages in the front-end 207. For example, instructions such as certain memory access instructions and memory management instructions may be committed by circuitry in the front-end 207 using such communication, as described in more detail below.

Between adjacent stages of the pipeline 104, the various paths through the pipeline circuitry include pipeline registers 211 (shown in FIG. 2 for the execution stages), which store results of an upstream stage waiting to be passed downstream to the next stage. The pipeline registers 211 may be clocked by (i.e., receive a clock signal derived from) a common clock (not shown). Thus, each clock cycle, each pipeline register 211 (also called a latch, or a set of flip-flops) passes a result from its input to its output and becomes ready to receive a new result in its input after that result has been produced by the circuitry of that stage.

There may be multiple separate paths through the execution stages that include various circuitry for executing different types of instructions. In FIG. 2, two paths 208A and 208B are shown, but the execution stages may include any number of paths with corresponding circuitry separated by pipeline registers 211. The number of paths through the execution stages is generally dependent on the specific architecture but may include enough paths such that a number of instructions up to the issue width can progress through the same execution stages in the same cycles. The number of stages that include functional circuitry for a given path may also differ. In this example, the first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A, the second execution stage 208B, respectively, with the third execution stage 208C being simply a "silo stage" that passes a result along without performing further computation, ensuring that each path passes through the same number of stages through the pipeline. One path may include circuitry for executing memory instructions, another path may include units for various operations (e.g., ALU, multiplier, floating point unit), and another path may include circuitry for performing memory access instructions, including load instructions that read data values from the memory system, and store instructions to write data values to the memory system.

As described above, when a memory barrier instruction is decoded and issued, managing execution of the memory barrier instruction includes ensuring that any load and store instructions that occur before the memory barrier in program order are observable as having been performed before all load and store instructions that occur after the memory barrier in program order, based on observable effects of those instructions. In some implementations, appropriately managing memory barrier instructions includes configuring the pipeline 104 to handle load instructions and store instructions differently.

For store instructions, since speculative out-of-order issuance of load instructions may provide greater performance benefit than speculative out-of-order issuance of store instructions, the pipeline 104 may be configured to prevent speculative out-of-order issuance of store instructions. By ensuring that store instructions are issued by the front-end 207 in-order (with respect to each other and with respect to in-order load instructions), the back-end 209 is able to handle store instructions without the need to re-order any results or observable effects of instructions to account for memory barrier instructions. In particular, the back-end 209 is able to perform steps with potentially observable effects, such as sending data to be stored to a write buffer, without requiring ordering information to be maintained in the back-end 209. Data from multiple store instructions can be accumulated in the write buffer until the write buffer is flushed. In some implementations, execution of a memory barrier instruction causes committed store instructions in the write buffer to be flushed from the write buffer. Load or store instructions ordered after the memory barrier instruction can be held by the front-end 207 in the issue queue until the processor memory system 108 has indicated (e.g., using the pathway 218) that all store instructions ordered before the memory barrier instruction are globally observable (e.g., have been sent to the write buffer, or have been flushed from the write buffer) before the memory barrier instruction is committed.

For load instructions, since it may be more efficient to manage ordering information in structures accessible to the front-end 207, the front-end 207 can be configured to manage observable effects of load instructions in response to memory barrier instructions. This may avoid some of the complexity that would otherwise be needed to maintain ordering information in the back-end 209. For example, potentially complex back-end ordering logic can be avoided, and/or the overhead of tagging instructions with ordering information can be avoided. A simpler load ordering ring 220 accessible to the front-end 207 can be used to keep track of the program order of load instructions. Because the program order is known at the front-end 207, e.g., based on an order in which instructions are decoded, it is convenient to update the load ordering ring 220 for a predetermined number of load instructions (e.g., based on the size of the instruction window, such as a field that rolls over after twice the maximum number of instructions in the instruction window).

The front-end 207 is able to commit load instructions, which may have been issued out-of-order, based on information stored in the load ordering ring 220. For example, load instructions that are ordered before a memory barrier instruction are committed before the memory barrier instruction is committed, and load instructions that are ordered after the memory barrier instruction are committed after the memory barrier instruction is committed. The front-end 207 can also use information received form the back-end 209 (e.g., using the pathway 218), to determine if load instructions are ready to be committed, or if load instructions may need to be reissued. The front-end 207 may also take into account information affecting the validity of address translations. For example, an invalidation of a translation for one or more virtual addresses may have been received after an out-of-order load instruction has been issued and before a memory barrier instruction has completed. The issue circuitry 206 can be configured to determine whether to re-issue the load instruction based on whether the target address of the load instruction is affected by the invalidation.

In some implementations, not all load instructions are allowed to be out-of-order (though they may still issue out-of-order). For example, load instructions that target addresses in a portion of memory space reserved for input/output (I/O) device access (also called "I/O load" instructions) may be managed to always execute in-order. This ensures that I/O load instructions will not cause any side-effects to be incorrectly repeated. One way to accomplish this is to have the back-end 209 identify load instructions as I/O load instructions (after address translation has been performed), and communicate with the front-end 207 (before execution and thus before any potential side-effects) to re-issue the I/O load instruction in-order with an indication that it is an I/O load instruction. The back-end 209, when receiving a load instruction explicitly identified as an I/O load instruction can then safely execute the I/O load instruction.

Generally, handing a memory barrier instruction potentially includes handling four different categories of outstanding (i.e., not-yet committed) memory access instructions that may have been decoded by the time the memory barrier instruction issues. There may be (A) load instructions that issued before the memory barrier instruction was issued and that have not yet been committed. There may be (B) store instructions issued before the memory barrier instruction was issued and that have not yet been committed. There may be (C) load instructions that were ready to issue but had not yet issued before the memory barrier instruction was issued. There may be (D) store instructions that were ready to issue but had not yet issued before the memory barrier instruction was issued.

Load and store instructions in different categories may be handled differently when a memory barrier instruction is being handled. Since store instructions are issued in-order, store instructions ordered before the memory barrier instruction are in category B, and store instructions ordered after the memory barrier instruction are in category D. Store instructions in category B have already been issued, so the back-end 209 can simply complete execution for any store instructions received (without needing to have access to program order). Store instructions ordered after the memory barrier instruction have not yet been issued, and will not be issued by the front-end 207, and therefore the back-end 209 will not need to manage any store instructions for category D. For a load instruction in category C, the front-end 207 will only issue those that are ordered before the memory barrier instruction, so the back-end 209 can simply complete execution for any load instructions received (without needing to have access to program order) and notify the front-end 207 when they are complete.

This leaves instructions in category A. Some of these issued load instructions in category A are ordered before the memory barrier instruction, and other of these issued load instructions (called "speculative loads") were speculatively issued before the memory barrier instruction but are not ordered before the memory barrier instruction according to program order. The front-end 207 can use the load ordering ring 220, and/or other ordering information, to determine the program order of an issued load instruction. For those load instructions that are ordered before the memory barrier instruction, the front-end 207 can commit them in-order after the back-end 209 notifies the front-end 207 that they are complete. But, for speculative loads, the front-end 207 does not necessarily commit them after the back-end 209 notifies the front-end 207 that they are complete. Before determining whether or not to commit a speculative load instruction that has completed, the font-end 207 may determine whether or not to reissue the speculative load instruction (ignoring any data loaded by the previously completed speculative load instruction).

In some implementations, the front-end 207 may be configured to always reissue a speculative load instruction that was issued before a memory barrier instruction but is ordered after that memory barrier instruction. In other implementations, the front-end 207 is configured to selectively reissue such speculative load instructions. If a speculative load instruction loaded a value, the speculative load instruction may not need to be reissued unless the address of that value matches an address invalidated by an invalidation instruction that is ordered before the memory barrier instruction and after the speculative load instruction.

After any speculative load instructions are reissued if necessary, the front-end 207 can use ordering information, and a commit buffer that stores results of any instructions that have completed execution but are not yet committed, to ensure that all instructions are committed in program order. As part of committing load instructions, the front-end 207 enables any data loaded to be accessible (e.g., in a register). As part of committing store instructions, the front-end 207 enables any data to be stored to be sent for storage (e.g., initially being sent to a write buffer). If the back-end 209 encountered any problems successfully completing execution of any instruction, the back-end 209 can communicate with the front-end 207 (e.g., using the pathway 218), and the front-end 209 can handle any such problems, possibly by reissuing certain instructions or waiting for the back-end 209 to provide delayed results, before committing affected instructions.

Other embodiments are within the scope of the following claims.

What is claimed is:

1. An integrated circuit comprising:
at least a first processor core executing instructions in a pipeline, wherein the pipeline includes one or more stages in a front-end portion of the pipeline and a plurality of stages in a back-end portion of the pipeline, the front-end portion including a stage that speculatively issues at least some instructions out-of-order with respect to a program order and prevents speculative out-of-order issuance of all store instructions issued at the front-end portion, and the back-end portion including one or more stages that access a processor memory system;
front-end control circuitry configured to manage execution of instructions based on information available in the front-end portion; and
back-end control circuitry configured to manage execution of instructions based on information available in the back-end portion,
wherein managing execution of a first memory barrier instruction includes:
the front-end control circuitry issuing store instructions in-order with respect to other store instructions and with respect to load instructions that are designated to be issued in-order while allowing speculative out-of-order issuance of other load instructions,
the back-end control circuitry providing information accessible to the front-end control circuitry indicating that one or more particular memory instructions have completed handling by the processor memory system,
the front-end control circuitry identifying one or more load instructions that were issued before the first memory barrier instruction was issued and are ordered after the first memory barrier instruction in the program order, and
the front-end control circuitry causing at least one of the identified load instructions to be reissued after the first memory barrier instruction has been issued.

2. The integrated circuit of claim 1, wherein causing at least one of the identified load instructions to be reissued after the first memory barrier instruction has been issued includes causing all of the identified load instructions to be reissued after the first memory barrier instruction has been issued.

3. The integrated circuit of claim 1, wherein causing at least one of the identified load instructions to be reissued after the first memory barrier instruction has been issued comprises causing one or more selected load instructions of the identified load instructions to be reissued after the first memory barrier instruction has been issued, where a particular selected load instruction includes any load instruction that includes a target address that matches an address associated with an invalidation instruction that was issued before the first memory barrier instruction and after the particular selected load instruction.

4. The integrated circuit of claim 3, wherein the invalidation instruction is received by the first processor core from a second processor core that is included in the integrated circuit in communication with the first processor core.

5. The integrated circuit of claim 1, wherein the one or more particular memory instructions include all store instructions that: (1) are ordered before the first memory barrier instruction in the program order, and (2) had not completed handling by the processor memory system when the first memory barrier instruction was received by the front-end control circuitry.

6. The integrated circuit of claim 1, wherein managing execution of the first memory barrier instruction further includes, by the front-end control circuitry: (1) determining that all instructions ordered before the first memory barrier instruction in the program order have completed execution, (2) committing, in the program order, all instructions ordered before the first memory barrier instruction in the program order, and (3) committing the first memory barrier instruction.

7. The integrated circuit of claim 1, wherein managing execution of the first memory barrier instruction further includes preventing speculative out-of-order issuance of input/output (I/O) load instructions by the stage that speculatively issues at least some instructions out-of-order.

8. The integrated circuit of claim 1, wherein the processor memory system further includes: a write buffer for initiating execution of store instructions, and a data cache for initiating execution of load instructions.

9. The integrated circuit of claim 8, wherein the information indicating that one or more particular memory instructions have completed handling by the processor memory system includes: information indicating that one or more particular store instructions have been sent to the write buffer, and results of one or more particular load instructions from the data cache or indication that one or more particular load instructions resulted in a miss in the data cache.

10. The integrated circuit of claim 1, wherein the front-end control circuitry maintains ordering information used to identify the one or more load instructions in storage accessible to the front-end control circuitry that is separate from decode circuitry in the front-end portion that stores decoded instructions in an issue queue.

11. The integrated circuit of claim 10, wherein the ordering information is stored in a ring-based data structure.

12. A method comprising:
executing instructions in a pipeline of at least a first processor core, wherein the pipeline includes one or more stages in a front-end portion of the pipeline and a plurality of stages in a back-end portion of the pipeline, the front-end portion including a stage that speculatively issues at least some instructions out-of-order with respect to a program order and prevents speculative out-of-order issuance of all store instructions issued at the front-end portion, and the back-end portion including one or more stages that access a processor memory system;

managing execution of instructions, in front-end control circuitry, based on information available in the front-end portion; and managing execution of instructions, in back-end control circuitry, based on information available in the back-end portion, wherein managing execution of a first memory barrier instruction includes:

the front-end control circuitry issuing store instructions in-order with respect to other store instructions and with respect to load instructions that are designated to be issued in-order while allowing speculative out-of-order issuance of other load instructions, the back-end control circuitry providing information accessible to the front-end control circuitry indicating that one or more particular memory instructions have completed handling by the processor memory system, the front-end control circuitry identifying one or more load instructions that were issued before the first memory barrier instruction was issued and are ordered after the first memory barrier instruction in the program order, and the front-end control circuitry causing at least one of the identified load instructions to be reissued after the first memory barrier instruction has been issued.

13. The method of claim 12, wherein causing at least one of the identified load instructions to be reissued after the first memory barrier instruction has been issued includes causing all of the identified load instructions to be reissued after the first memory barrier instruction has been issued.

14. The method of claim 12, wherein causing at least one of the identified load instructions to be reissued after the first memory barrier instruction has been issued comprises causing one or more selected load instructions of the identified load instructions to be reissued after the first memory barrier instruction has been issued, where a particular selected load instruction includes any load instruction that includes a target address that matches an address associated with an invalidation instruction that was issued before the first memory barrier instruction and after the particular selected load instruction.

15. The method of claim 14, wherein the invalidation instruction is received by the first processor core from a second processor core that is included in the integrated circuit in communication with the first processor core.

16. The method of claim 12, wherein the one or more particular memory instructions include all store instructions that: (1) are ordered before the first memory barrier instruction in the program order, and (2) had not completed handling by the processor memory system when the first memory barrier instruction was received by the front-end control circuitry.

17. The method of claim 12, wherein managing execution of the first memory barrier instruction further includes, by the front-end control circuitry: (1) determining that all instructions ordered before the first memory barrier instruction in the program order have completed execution, (2) committing, in the program order, all instructions ordered before the first memory barrier instruction in the program order, and (3) committing the first memory barrier instruction.

18. The method of claim 12, wherein managing execution of the first memory barrier instruction further includes preventing speculative out-of-order issuance of input/output (I/O) load instructions by the stage that speculatively issues at least some instructions out-of-order.

19. The method of claim 12, wherein the processor memory system further includes: a write buffer for initiating execution of store instructions, and a data cache for initiating execution of load instructions.

20. The method of claim 19, wherein the information indicating that one or more particular memory instructions have completed handling by the processor memory system includes: information indicating that one or more particular store instructions have been sent to the write buffer, and results of one or more particular load instructions from the data cache or indication that one or more particular load instructions resulted in a miss in the data cache.

21. The method of claim 12, wherein the front-end control circuitry maintains the ordering information used to identify the one or more load instructions in storage accessible to the front-end control circuitry that is separate from decode circuitry in the front-end portion that stores decoded instructions in an issue queue.

22. The method of claim 21, wherein the ordering information is stored in a ring-based data structure.

* * * * *